(12) United States Patent
Onishi

(10) Patent No.: US 9,168,615 B2
(45) Date of Patent: Oct. 27, 2015

(54) REPAIR DEVICE

(75) Inventor: Ken Onishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 657 days.

(21) Appl. No.: 13/519,442

(22) PCT Filed: Dec. 20, 2010

(86) PCT No.: PCT/JP2010/072909
§ 371 (c)(1),
(2), (4) Date: Jun. 27, 2012

(87) PCT Pub. No.: WO2011/086817
PCT Pub. Date: Jul. 21, 2011

(65) Prior Publication Data
US 2012/0308321 A1  Dec. 6, 2012

(30) Foreign Application Priority Data

Jan. 14, 2010 (JP) ................................. 2010-006076

(51) Int. Cl.
*B23B 3/22* (2006.01)
*G21C 17/017* (2006.01)
*B23K 37/02* (2006.01)
(Continued)

(52) U.S. Cl.
CPC ....... *B23K 37/0276* (2013.01); *B23B 29/03489* (2013.01); *B23B 29/32* (2013.01); *G21C 17/017* (2013.01); *G21C 19/207* (2013.01); *Y10T 29/511* (2015.01); *Y10T 29/5109* (2015.01);
(Continued)

(58) Field of Classification Search
CPC ...... G21C 17/017; G21C 19/207; B23B 3/26; B23B 41/00; B23B 29/03489; B23B 29/32; B23Q 9/0057; B23Q 9/00; B23P 23/02; B23K 37/0276; Y10T 408/5583; Y10T 29/511; Y10T 29/5109; Y10T 82/22; Y10T 29/5168; B23L 37/0276
See application file for complete search history.

(56) References Cited

U.S. PATENT DOCUMENTS 4,084,484 A * 4/1978 Shklyanov et al. ........... 409/140
4,383,395 A * 5/1983 Wilger et al. ................. 451/440
(Continued)

FOREIGN PATENT DOCUMENTS

JP   57-033903 A   2/1982
JP   03-500624 A   2/1991
(Continued)

OTHER PUBLICATIONS

International Search Report of PCT/JP2010/072909, mailing date Mar. 15, 2011.
(Continued)

*Primary Examiner* — Eric A. Gates
*Assistant Examiner* — Paul M Janeski
(74) *Attorney, Agent, or Firm* — Westerman, Hattori, Daniels & Adrian, LLP

(57) ABSTRACT

This repair device includes a casing, a slide shaft slidably arranged with respect to the casing, a turn table rotatably arranged with respect to the slide shaft, and a cutting mechanism installed on the turn table and including cutting tools. The turn table is rotationally displaced while the slide shaft slides in an axial direction, so that the cutting tools helically turn to cut an inner periphery of a nozzle. The cutting mechanism includes a cutting-tool switching unit that switches the cutting tools.

2 Claims, 14 Drawing Sheets

(51) Int. Cl.
*B23B 29/034* (2006.01)
*B23B 29/32* (2006.01)
*G21C 19/20* (2006.01)

(52) U.S. Cl.
CPC .............. *Y10T29/5168* (2015.01); *Y10T 82/22* (2015.01); *Y10T 408/5583* (2015.01)

(56) References Cited

U.S. PATENT DOCUMENTS

| | | | |
|---|---|---|---|
| 4,824,296 A | | 4/1989 | Strait |
| 4,842,452 A | | 6/1989 | Strait |
| 4,934,109 A | * | 6/1990 | Allred .............................. 451/51 |
| 5,054,976 A | * | 10/1991 | Akesaka et al. .............. 409/143 |
| 5,368,423 A | * | 11/1994 | Hanna ........................... 409/132 |
| 6,264,537 B1 | * | 7/2001 | Penza .............................. 451/51 |
| 7,168,606 B2 | * | 1/2007 | Badrak ........................... 228/155 |
| 2009/0307891 A1 | * | 12/2009 | Offer et al. ................. 29/402.11 |

FOREIGN PATENT DOCUMENTS

| | | |
|---|---|---|
| JP | 2001-099987 A | 4/2001 |
| JP | 2006-349596 A | 12/2006 |

OTHER PUBLICATIONS

Written Opinion of PCT/JP2010/072909, mailing date Mar. 15, 2011.

English Translation Only of Written Opinion of PCT/JP2010/072909, mailing date Mar. 15, 2011 (3 pages).

Japanese Decision of a Patent Grant dated Oct. 1, 2013, issued in Japanese Patent Application No. 2010-006076, w/English translation.

* cited by examiner

VIEW FROM A-A

VIEW FROM C

REPAIR DEVICE

FIELD

The present invention relates to a repair device, and more particularly to a repair device that can streamline a repairing operation.

BACKGROUND

In a nuclear plant, a repairing operation for repairing a welded part between a nozzle and a pipe in a reactor containment is performed to ensure safety and reliability thereof. As a repair device used for such a repairing operation, a technique described in Patent Literature 1 has been known.

CITATION LIST

Patent Literature

Patent Literature 1: Japanese Patent Application Laid-open No. 2006-349596

SUMMARY

Technical Problem

An object of the present invention is to provide a repair device that can streamline a repairing operation.

Solution to Problem

According to an aspect of the present invention, a repair device that repairs a welded part on an inner peripheral side of a pipe, includes: a casing; a slide shaft slidably arranged with respect to the casing; a turn table rotatably arranged with respect to the slide shaft; and a cutting mechanism installed on the turn table and including a plurality of cutting tools for cutting the welded part. The turn table is rotationally displaced while the slide shaft slides in an axial direction, so that the cutting tools helically turn to cut an inner periphery of the pipe, and the cutting mechanism includes a cutting-tool switching unit that switches the cutting tools.

In this repair device, the cutting tools helically turn to cut the inner periphery of the pipe. Therefore, when an area to be cut is wide, replacement of the cutting tools becomes necessary. At this time, the cutting mechanism performs cutting while replacing the cutting tools by the cutting-tool switching unit, thereby enabling to continue a cutting operation, with the repair device being installed in the pipe. Accordingly, a repairing operation is streamlined.

Advantageously, in the repair device, the cutting-tool switching unit includes a switching-unit main body installed on a side of the turn table, a cutting-tool support body that supports the cutting tools and switches the cutting tools by a rotational displacement, and a drive mechanism that is connected to the cutting-tool support body via a ratchet mechanism. Further, when the drive mechanism is driven in a predetermined forward direction, the ratchet mechanism engages to rotate the cutting-tool support body, and when the drive mechanism is driven in an opposite direction, the ratchet mechanism restricts rotations of the cutting-tool support body.

According to this repair device, when the drive mechanism is driven in a predetermined forward direction, the ratchet mechanism engages to rotate a fitted rotating shaft. Accordingly, the cutting-tool support body is rotated to enable switching of the cutting tools. On the other hand, when the drive mechanism is driven in the opposite direction, the ratchet mechanism restricts rotations of the fitted rotating shaft. Accordingly, the drive mechanism returns to an initial position without switching the cutting tools 41.

Advantageously, in the repair device, the cutting-tool switching unit includes a fixing structure that supplies fluid to between the fitted rotating shaft and the switching-unit main body and presses the fitted rotating shaft to the switching-unit main body, thereby fixing the fitted rotating shaft.

According to this repair device, a fluid pressure is applied between the fitted rotating shaft and the switching-unit main body, thereby fixing the cutting-tool support body to the switching-unit main body via the fitted rotating shaft. Furthermore, by releasing the fluid pressure, the cutting-tool support body can be rotated, thereby enabling to switch the cutting tools. Therefore, fixing and releasing of the cutting-tool switching unit can be performed with a simple configuration.

Advantageous Effects of Invention

According to the repair device of the present invention, cutting tools helically turn to cut an inner periphery of a pipe. Therefore, when an area to be cut is wide, replacement of the cutting tools becomes necessary. At this time, the cutting mechanism performs cutting while replacing the cutting tools by the cutting-tool switching unit, thereby enabling to continue a cutting operation, with the repair device being installed in the pipe. Accordingly, a repairing operation is streamlined.

DESCRIPTION OF EMBODIMENTS

The present invention is explained below in detail with reference to the accompanying drawings. The present invention is not limited to the following embodiment. In addition, constituent elements in the embodiment include elements that can be easily replaced or obviously replaceable while maintaining the unity of invention. A plurality of modifications described in the following embodiment can be arbitrarily combined within a scope obvious to persons skilled in the art.

[Repairing Process of Reactor Containment]

Figure 17:
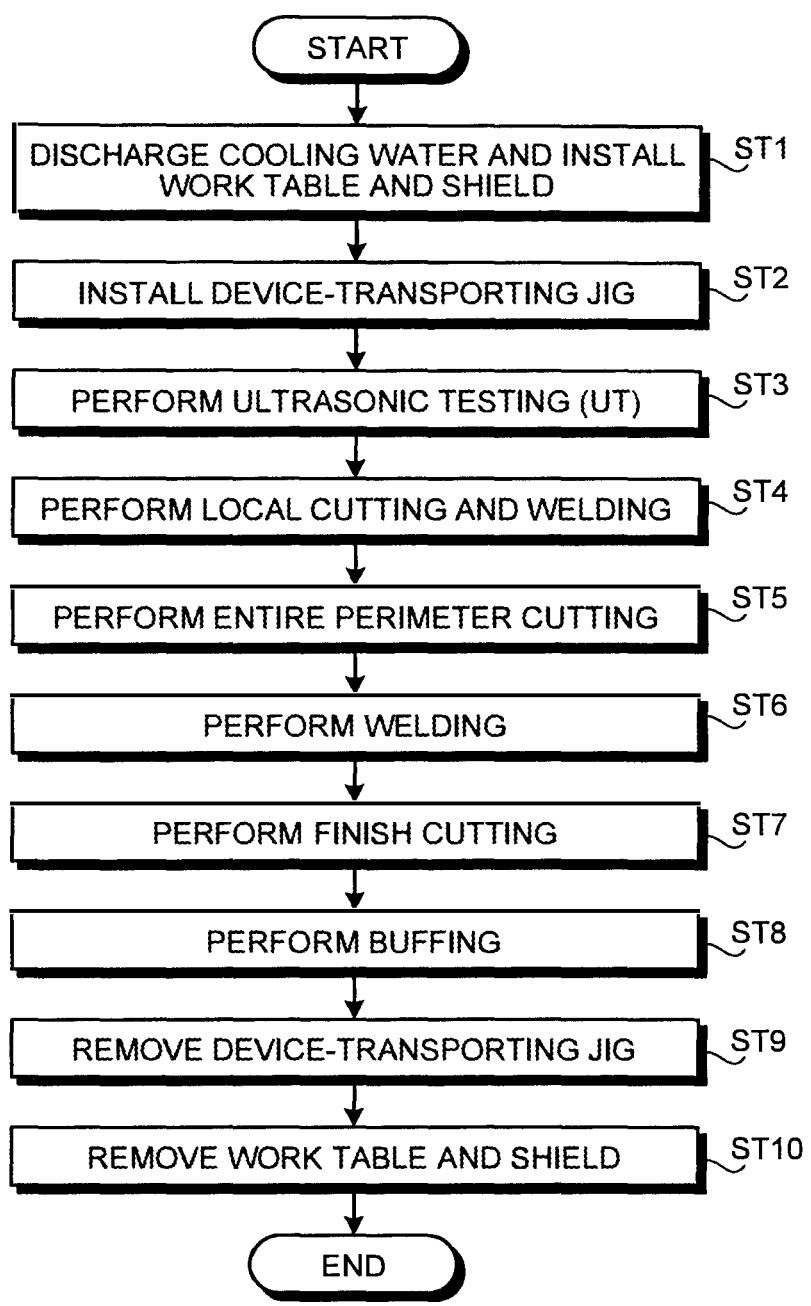
FIG. 17 is a flowchart of a repairing process of a reactor containment.
Figure 18:
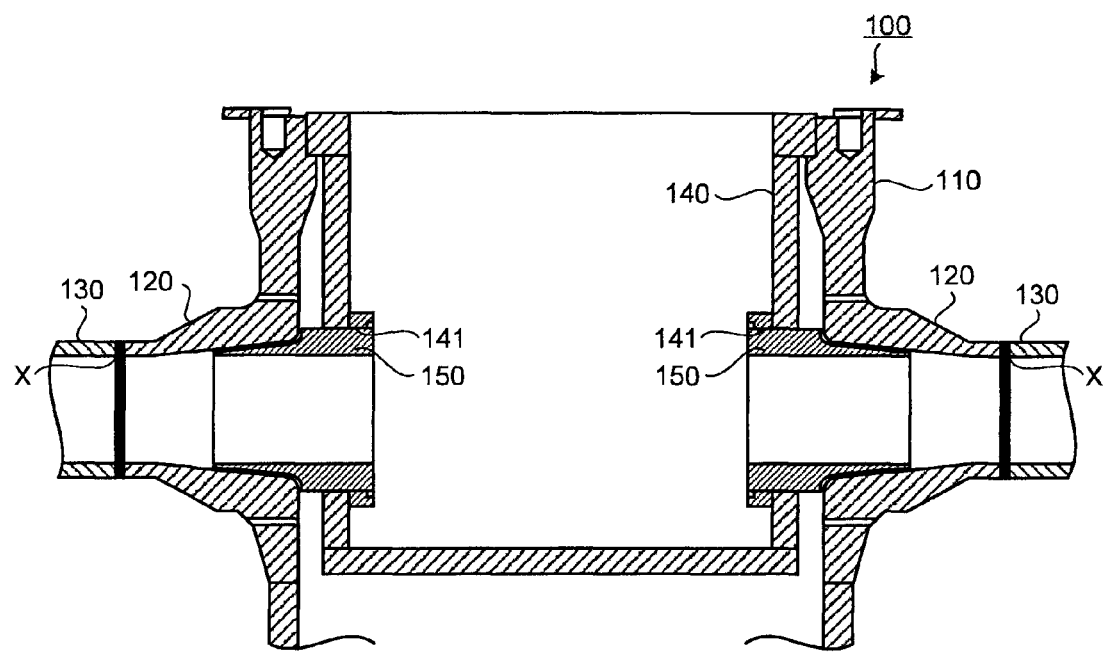
FIG. 18 is an explanatory diagram of a welded part between a nozzle and a pipe in the reactor containment.

FIG. 17 is a flowchart of a repairing process of a reactor containment. FIG. 18 is an explanatory diagram of a welded part between a nozzle and a pipe in the reactor containment.

In a reactor containment 100, maintenance is regularly performed to ensure safety and reliability thereof. For example, the reactor containment 100 includes a nozzle 120 provided on a side of an outer periphery of a containment main body 110 and a cooling water pipe (an inlet pipe or an outlet pipe) 130 (see FIG. 18). The nozzle 120 and the pipe 130 have a substantially cylindrical inner periphery and are connected by welding from at least one of the inner peripheral side and the outer peripheral side. Generally, the nozzle 120 and the pipe 130 are made of a material different from each other, and welded by nickel based alloy 600. Maintenance such as a repairing operation is required for a welded part between the nozzle 120 and the pipe 130. As an example, a case where a repairing operation is performed at a welded part X on the inner peripheral side of the nozzle 120 and the pipe 130 is explained.

First, as a preparation step (Step ST1), a work table 140 having a cylindrical container shape is inserted into the containment main body 110 and installed therein. The work table 140 transports various types of repair devices required for a repairing operation (an inspection device, a cutting device, a welding device, and a buff device described later) into the nozzle 120, and has an opening 141 at a position corresponding to the nozzle 120. A gap between the containment main body 110 and the work table 140 is then sealed and joined by using a flange. Subsequently, cooling water below the flange is discharged, and a water level of cooling water is set such that the water level becomes at least below the nozzle 120 of the containment main body 110 (see FIG. 17 and FIG. 18). A shield 150 is inserted into the nozzle 120 from the opening 141 of the work table 140 and installed therein. The shield 150 is a member that fills a gap between the opening 141 of the work table 140 and the nozzle 120 and extends the opening 141 to the inner periphery of the nozzle 120. The shield 150 forms a cylindrical inner wall surface (an installation space of the repair device) extending from the opening 141 of the work table 140 to the welded part X of the nozzle 120. A stopper (not shown) is installed on an inner side of the pipe 130 to form a seal for blocking radiation and preventing dispersion of foreign substances.

Next, a device-transporting jig (not shown) is installed (Step ST2). The device-transporting jig transports the repair device and is installed at the bottom of the work table 140. For example, the device-transporting jig is formed by a turn table having a telescopic arm. When the repair device is transported into the welded part X, the repair device is suspended in the work table 140, and the device-transporting jig transports the repair device into the nozzle 120 and installs the repair device in the nozzle 120. At this time, the device-transporting jig holds the repair device by the arm, and extends the arm to insert the repair device into the nozzle 120 from the opening 141 of the work table 140. Accordingly, the repair device is transported into the nozzle 120. Thereafter, the device-transporting jig is detached from the repair device, contracts the arm, and is returned to an original position. On the other hand, when the repair device is to be removed from the welded part X, the device-transporting jig extends the arm again to hold the repair device in the nozzle 120, contracts the arm, and recovers the repair device into the work table 140. The repair device is then hoisted and transported to outside of the work table 140. With these processes, transporting in/out of the repair device is performed.

Next, an ultrasonic testing (UT) using ultrasonic waves is performed (inspection step ST3). The UT is a test for acquiring required data of the welded part X (for example, data relating to the presence and position of a defect in the welded part X). At Step ST3, an inspection device for performing the UT (not shown) is transported in by the device-transporting jig and installed near the welded part X of the nozzle 120. The inspection device performs the UT to acquire necessary inspection data. For example, the inspection data includes a position of the welded part X, a position of a large crack generated in the welded part X (a crack requiring local cutting described later) and the like. The acquired inspection data is transmitted from the inspection device to a controller (not shown) in a monitoring facility located outside of the reactor containment 100. Furthermore, the inspection device punches a mark near the welded part X, for indicating the position of the welded part X or the position of a crack. Thereafter, the inspection device is transported out of the nozzle 120 and then recovered.

Figure 19:
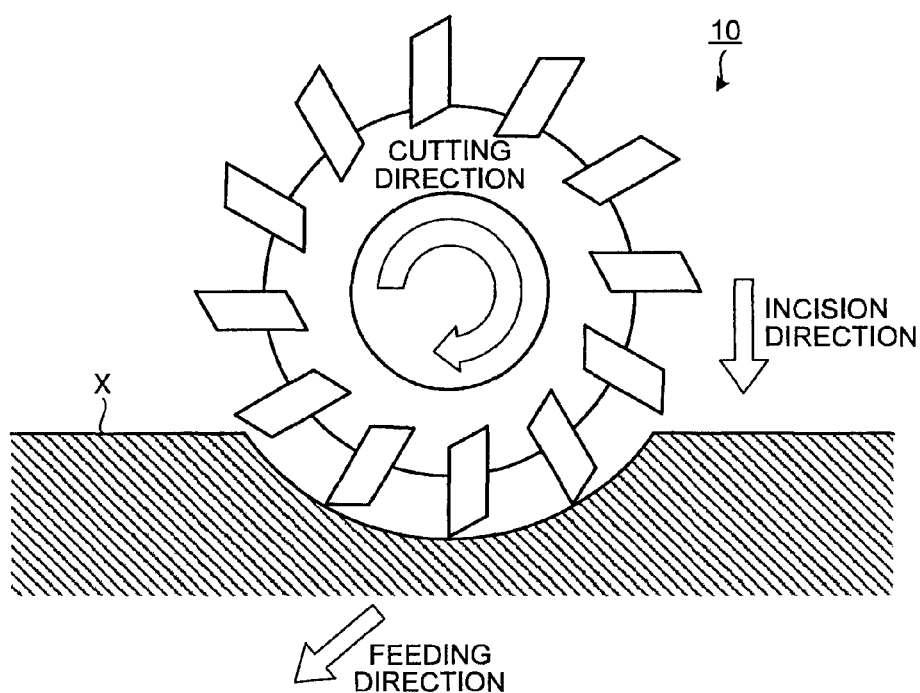
FIG. 19 is an explanatory diagram of a state of local cutting.

Next, local cutting is performed according to need (local cutting step ST4). FIG. 19 is an explanatory diagram of a state of a local cutting. The local cutting is for locally and deeply cutting a cracked portion in the welded part X, when there is a large crack in the welded part X. In the local cutting, a cutter 10 for cutting is used (see FIG. 19). The cutter 10 is a rotatable tool formed by arranging a plurality of cutting tools in a circumferential direction. The cutter 10 is fitted to the cutting device (or another repair device) and used. At Step ST4, first, the cutting device mounted with the cutter 10 is transported into the nozzle 120 by the device-transporting jig, and is installed near the welded part X of the nozzle 120. After centering is performed with respect to the inner periphery of the nozzle 120, the cutting device is fixedly installed. The cutting device is then positioned with respect to the cracked portion in the welded part X based on the inspection data acquired at Step ST3 (and punching). Subsequently, local cutting is performed. In the local cutting, the cutter 10 is applied to the cracked portion in the welded part X and rotated, thereby performing local cutting of the welded part X (for example, cutting to a depth up to 49 [mm]). Thereafter, the cutting device is transported out of the nozzle 120 and then recovered.

When the local cutting (Step ST4) is performed, a weld deposit is produced as well for filling a locally cut portion.

Next, entire perimeter cutting is performed (entire-perimeter cutting step ST5). The entire perimeter cutting is for cutting a certain area including the welded part X to a certain depth over the entire perimeter of the inner periphery of the nozzle 120. At Step ST5, cutting of the welded part X as a target to be repaired is performed prior to welding described later. First, the cutting device is transported in by the device-transporting jig and installed near the welded part X of the nozzle 120. Centering of the cutting device is then performed with respect to the inner periphery of the nozzle 120 and fixedly installed. The cutting device is then positioned with respect to the welded part X in an axial direction of the nozzle 120 based on the inspection data acquired at Step ST3 (and punching). Subsequently, entire perimeter cutting is performed with respect to a certain area including the welded part X. Thereafter, the cutting device is transported out of the nozzle 120 and then recovered. In the present embodiment, the cutting device performs entire perimeter cutting by using the cutting tools for cutting. A specific configuration of the cutting device and a specific content of the entire perimeter cutting are explained later in detail.

Next, welding is performed (welding step ST6). The welding produces a weld deposit in an area having already subjected to the entire perimeter cutting (Step ST5). At Step ST6, first, the welding device is transported in by the device-transporting jig and installed near the welded part X of the nozzle 120. Centering and positioning of the welding device are then performed. Subsequently, the welding device produces a weld deposit in a locally cut portion (Step ST4). The welding device welds the area having already subjected to the entire perimeter cutting (Step ST5) throughout the area. Thereafter, the welding device is transported out of the nozzle 120 and then recovered.

Next, finish cutting is performed (finish cutting step ST7). The finish cutting is for performing finish cutting to an area already welded (Step ST6). At Step ST7, first, the cutting device is transported in by the device-transporting jig and installed near the welded part X of the nozzle 120. Centering and positioning of the cutting device are then performed. Subsequently, the cutting device performs finish cutting to the area already welded (Step ST6). The finish cutting is performed in the same manner as in the entire perimeter cutting (Step ST5). In the present embodiment, the cutting device also serves as the buff device as described later. Therefore, the cutting device (the repair device) is not recovered from the nozzle 120, and directly performs the next step ST8.

Next, buffing is performed (buffing step ST8). This buffing is for performing buffing to the area having subjected to the finish cutting (Step ST7), and an object thereof is to reduce a residual stress in the welded part X. At Step ST8, because the cutting device also serves as the buff device as described later, an installation step, a centering step, and a positioning step of the buff device are omitted. The buff device then performs buffing to the area having subjected to the finish cutting (Step ST7). Thereafter, the buff device (also serves as the cutting device) is transported out of the nozzle 120 and then recovered.

In a general reactor containment 100, the containment main body 110 has a plurality of nozzles 120 (see FIG. 18). Therefore, in the welded parts X of these nozzles 120, a series of steps of from Step ST3 to Step ST8 are performed respectively. In the present embodiment, a repair device 1 described later includes a clamp mechanism 3, and thus the repair device 1 is installed in the nozzle 120 in a self-standing manner. With this configuration, a plurality of repair devices 1 are respectively installed in each of the nozzles 120, so that a repairing operation is performed for each of the nozzles 120 independently from each other. Accordingly, the repairing operation is performed efficiently. This feature is explained later.

Next, the device-transporting jig is hoisted and recovered from the work table 140 to outside of the containment main body 110 (Step ST9). Thereafter, the shield 150 is removed from the nozzle 120, and the work table 140 is removed (Step ST10). Accordingly, a repairing operation of the welded part X is complete.

[Repair Device of Reactor Containment]

Figure 1:
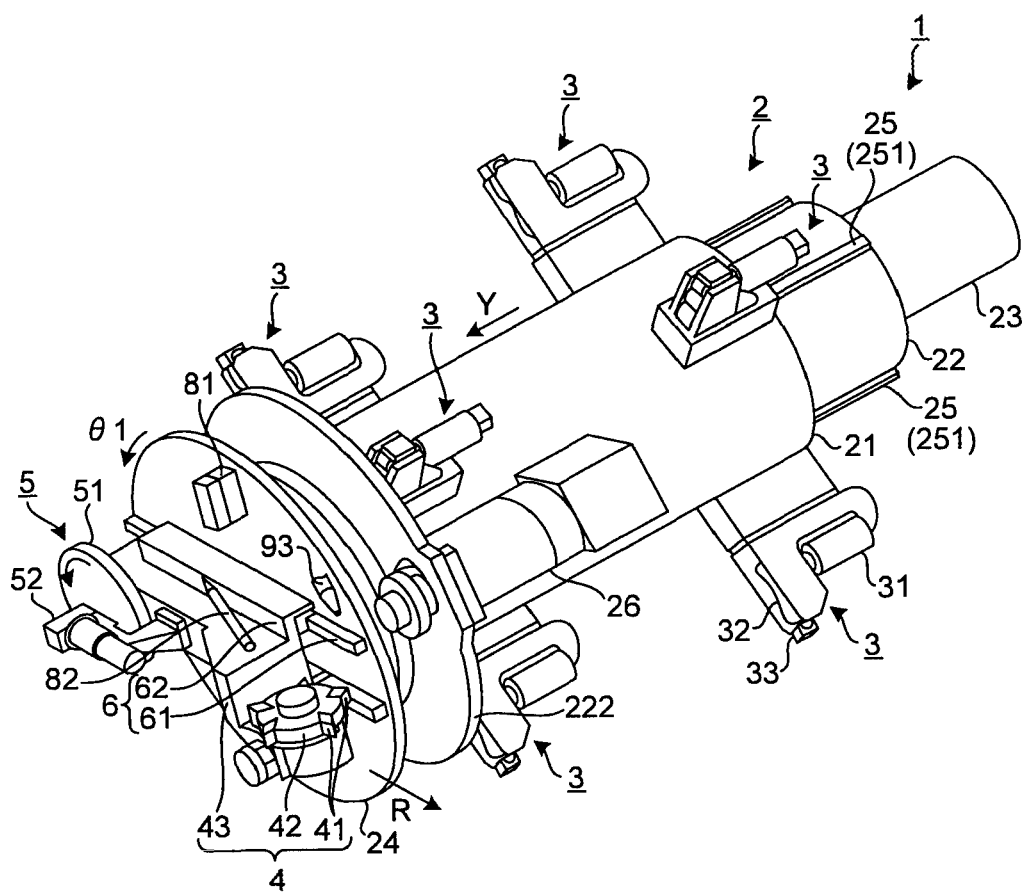
FIG. 1 is a perspective view of a repair device according to an embodiment of the present invention.
Figure 2:
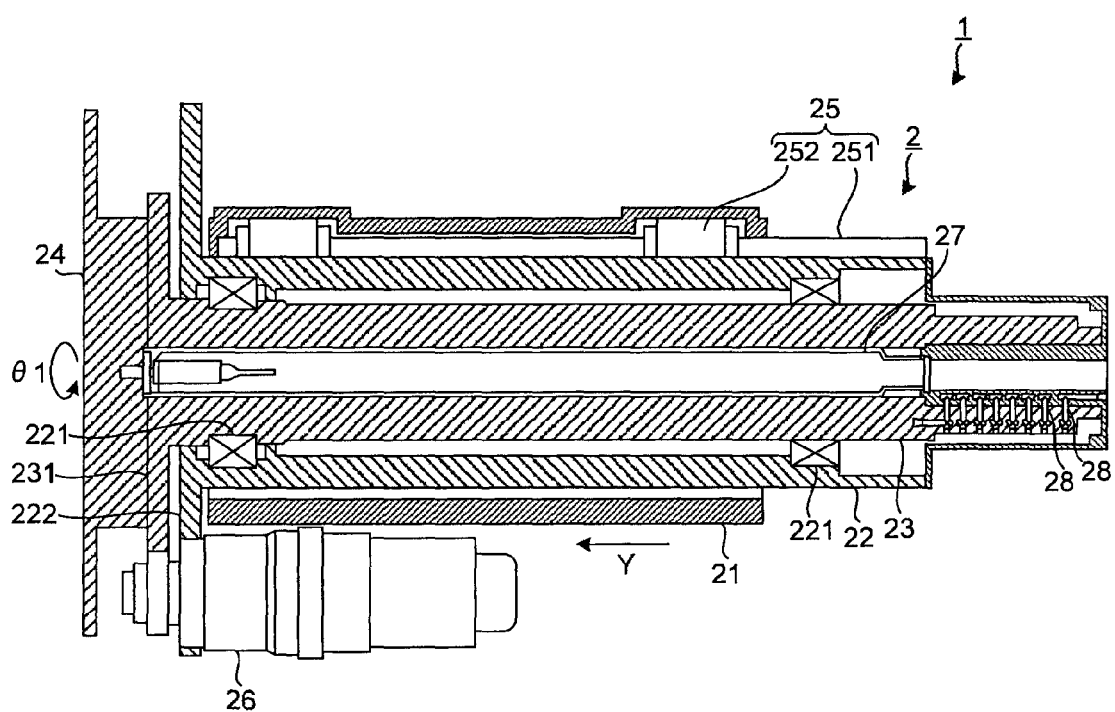
FIG. 2 is an axial sectional view of the repair device shown in FIG. 1.
Figure 3:
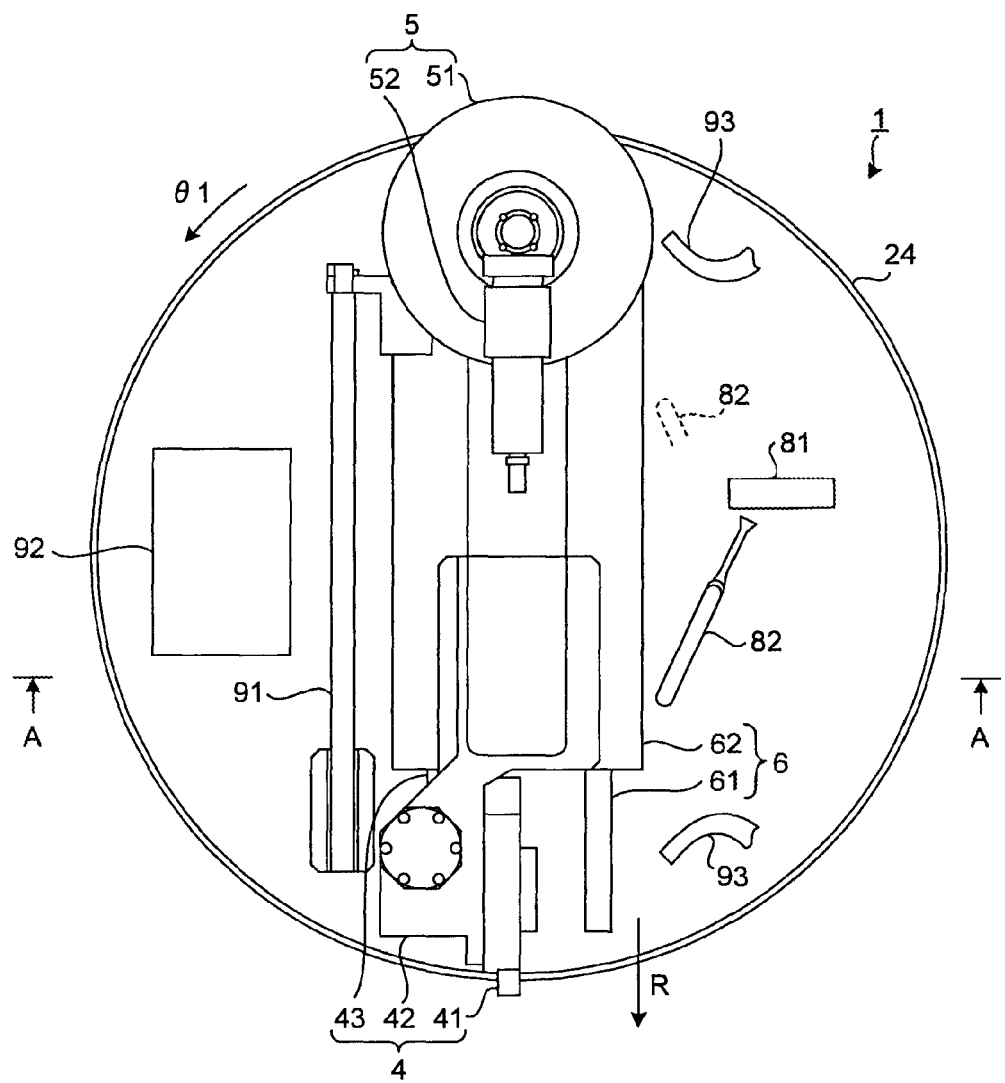
FIG. 3 is a plan view of a turn table of the repair device shown in FIG. 1.
Figure 4:
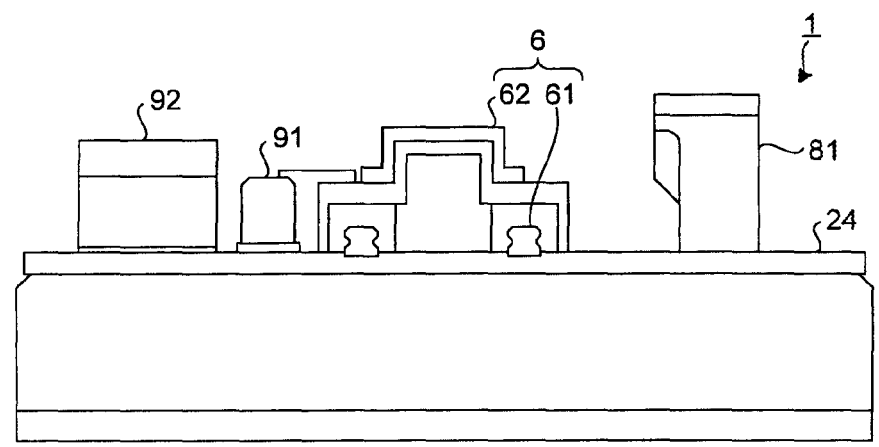
FIG. 4 is a front view of the turn table of the repair device shown in FIG. 1.
Figure 5:
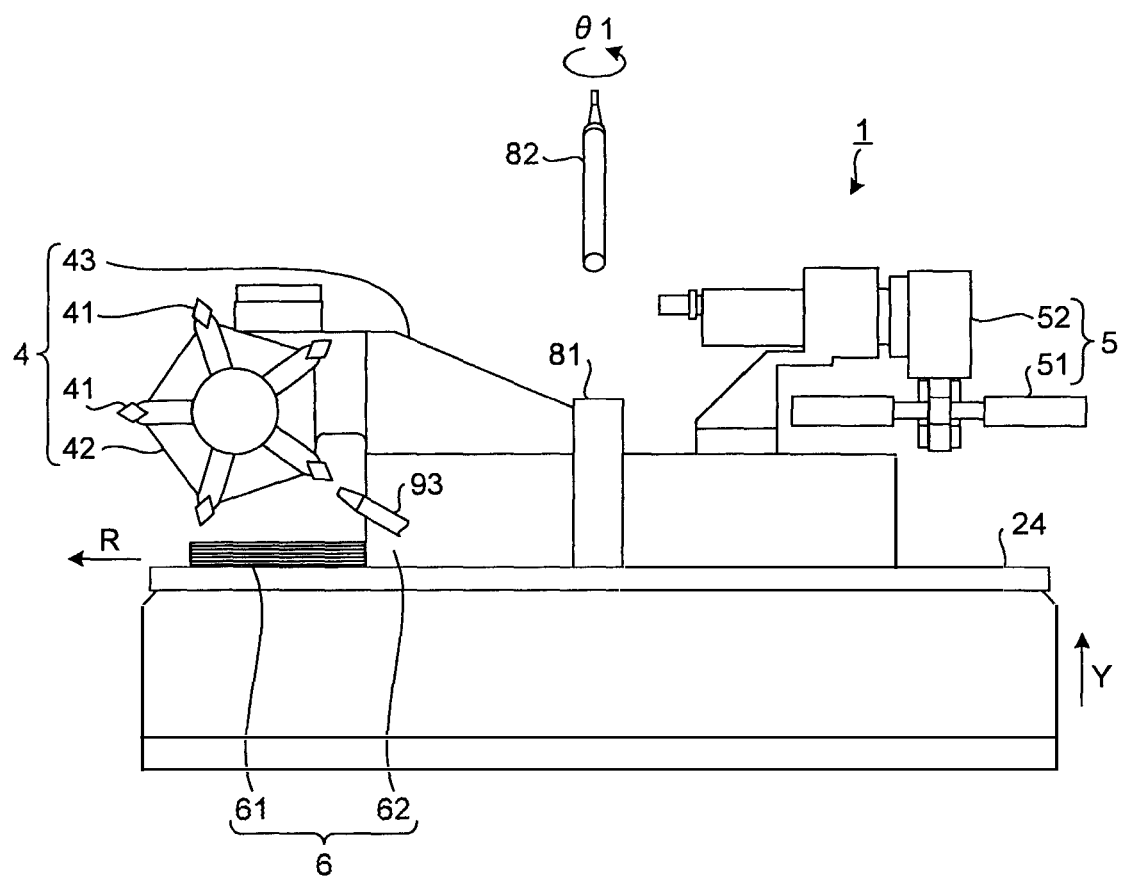
FIG. 5 is a side view of the turn table of the repair device shown in FIG. 1.
Figure 6:
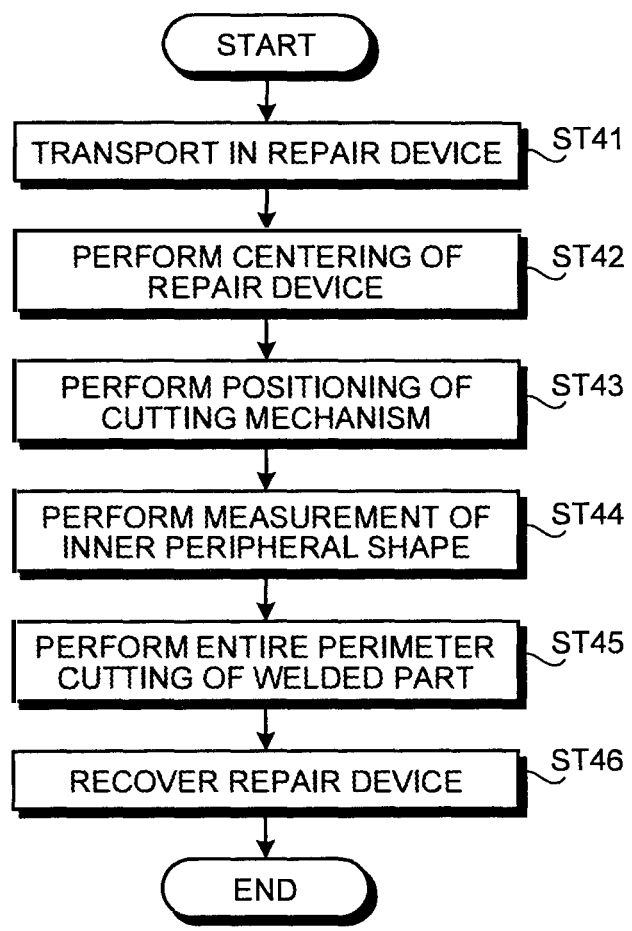
FIG. 6 is a flowchart of an entire-perimeter cutting process performed by the repair device shown in FIG. 1.

FIG. 1 is a perspective view of the repair device according to the embodiment of the present invention. FIG. 2 is an axial sectional view of the repair device shown in FIG. 1. FIGS. 3 to 5 are respectively a plan view (FIG. 3), a front view (FIG. 4), and a side view (FIG. 5) of a turn table of the repair device shown in FIG. 1.

The repair device 1 repairs a welded part on the inner peripheral side of a pipe, and is used for a repairing operation of, for example, the welded part X between the nozzle 120 and the pipe 130 of the reactor containment 100 on the inner peripheral side thereof (see FIG. 18). The repair device 1 includes a drive mechanism 2, the clamp mechanism 3, a cutting mechanism 4, a buff mechanism 5, an advancing and retracting mechanism 6, a laser sensor 81, and an image sensor 82. Therefore, the repair device 1 includes both functions of a cutting device and a buff device, and can perform entire perimeter cutting (Step ST5), finish cutting (Step ST7), and buffing (Step ST8).

The drive mechanism 2 includes a casing 21, a slide shaft 22, a rotating shaft 23, a turn table 24, a slide shaft actuator 25, and a rotating shaft actuator 26 (see FIGS. 1 and 2).

The casing 21 is made of a substantially cylindrical member. Centering and positioning of the casing 21 are performed with respect to the inner wall surface of the nozzle 120, thereby performing centering and positioning of the repair device 1.

The slide shaft 22 is slid and displaced in an axial direction (a Y direction) with respect to the casing 21, and has a hollow structure. The slide shaft 22 is inserted into the casing 21, and is connected to the casing 21 via the slide shaft actuator 25 in the casing 21. The slide shaft actuator 25 has a slider mechanism. The slide shaft actuator 25 is constituted by a guide rail 251 laid on an outer periphery of the slide shaft 22, a slider 252 fixedly installed on the inner periphery of the casing 21, and a servomotor (not shown) that drives the slider 252. The slide shaft 22 is driven by the slide shaft actuator 25, and is slid and displaced in the axial direction with respect to the casing 21. The servomotor is connected to a controller in a monitoring center and drive-controlled. For example, the slide shaft 22 has a stroke of 200 [mm], and can be slid and displaced in a speed range of 0 [mm/s] to 2 [mm/s].

The rotating shaft 23 is rotationally displaced about the slide shaft 22 (in a θ1 direction). The rotating shaft 23 is inserted into a hollow part of the slide shaft 22, and is rotatably supported by a pair of bearings 221, 221 in the slide shaft 22. The rotating shaft 23 includes a flange 231 at one end thereof, and is connected to the rotating shaft actuator 26 on an outer periphery of the flange 231. For example, the rotating shaft actuator 26 is a servomotor, and is installed on a side of the slide shaft 22. In the present embodiment, a flange 222 is formed at one end of the slide shaft 22, and the rotating shaft actuator 26 is fitted to the flange 222. The rotating shaft 23 is driven by the rotating shaft actuator 26, and is rotationally displaced about the slide shaft 22. The rotating shaft actuator 26 is connected to the controller in the monitoring center and drive-controlled. For example, the rotating shaft 23 can be rotationally displaced in a rotational speed range of 0 [rpm] to 14 [rpm].

The turn table 24 is a rotating table for installing the cutting mechanism 4, the buff mechanism 5, and the advancing and retracting mechanism 6 thereon. The turn table 24 is fixedly installed to the flange 231 of the rotating shaft 23 and rotates together with the rotating shaft 23. For example, in the present embodiment, the turn table 24 has a circular table shape, and a leg thereof is fixedly installed to the flange 231, with a table surface thereof being directed to the axial direction of the rotating shaft 23. For example, the turn table 24 rotates at a constant speed together with the rotating shaft 23.

The clamp mechanism 3 clamps the inner wall surface of the nozzle 120 to fix the casing 21 inside the nozzle 120 (see FIG. 1). A plurality of clamp mechanisms 3 are installed as a set on the outer periphery of the casing 21. For example, in the present embodiment, four clamp mechanisms 3 at opposite ends of the casing 21, in total, eight clamp mechanisms 3 are arranged with a gap of about 90 degrees. For example, the clamp mechanism 3 is formed by connecting a hydraulic cylinder 31 and a clamp 33 via a linking unit 32 (see FIG. 1). In the clamp mechanism 3, when the cylinder 31 is driven by remote control, the clamp 33 is driven via the linking unit 32 and displaced in a radial direction of the casing 21. The clamp 33 is pressed against the inner wall surface of the nozzle 120 to clamp the inner wall surface, thereby fixing the casing 21 in the nozzle 120. Because the clamp mechanisms 3 are driven by remote control to adjust an amount of displacement of the clamp 33 reciprocally, a position of the casing 21 with respect to the inner periphery of the nozzle 120 is adjusted. Accordingly, a centering operation of the repair device 1 (the casing 21) is performed. The cylinder 31 of the clamp mechanism 3 is connected to the controller in the monitoring center and drive-controlled.

The cutting mechanism 4 performs cutting (entire perimeter cutting) over the entire inner periphery of the nozzle 120 (see FIG. 1 and FIGS. 3 to 5). The cutting mechanism 4 includes a cutting tool 41 for cutting. The cutting mechanism 4 is fitted to the advancing and retracting mechanism 6 described later, and installed near an edge on the turn table 24. In the cutting mechanism 4, when the turn table 24 is rotated, the cutting tool 41 turns about an axis of rotation (in the θ1 direction) of the turn table 24 to cut the inner periphery of the nozzle 120 (rotational cutting). At this time, the cutting mechanism 4 is driven by the advancing and retracting mechanism 6 and slid and displaced in a predetermined direction (an R direction) on the turn table 24, thereby changing a cutting depth thereof. An operation of the cutting mechanism 4 is explained later in detail.

The buff mechanism 5 performs buffing with respect to the welded part X of the nozzle 120 (see FIG. 1 and FIGS. 3 to 5). The buff mechanism 5 includes a buff 51 and a drive part 52 for rotating the buff 51. Furthermore, the buff mechanism 5 is fitted to the advancing and retracting mechanism 6 described later and installed near the edge on the turn table 24. The buff mechanism 5 performs buffing of the inner periphery of the nozzle 120 by rotating (spinning) the buff 51 and pressing the buff 51 against the inner periphery of the nozzle 120. The turn table 24 rotates while the buff 51 is rotating, thereby moving (revolving) the position of the buff mechanism 5 about the axis of rotation (in the θ1 direction) of the turn table 24, to perform buffing with respect to the entire perimeter of the inner periphery of the nozzle 120. The drive part 52 of the buff mechanism 5 is connected to the controller in the monitoring center and drive-controlled. An operation of the buff mechanism 5 is explained later together with the operation of the cutting mechanism 4.

The advancing and retracting mechanism 6 causes the cutting mechanism 4 and the buff mechanism 5 to be displaced forward and backward on the turn table 24 (see FIG. 1 and FIGS. 3 to 5). For example, in the present embodiment, the advancing and retracting mechanism 6 is a slide mechanism, and is constituted by a rail 61 laid on the upper surface of the turn table 24 and extending in the radial direction (the R direction) of the turn table 24, a long slider 62 that is slid and displaced along the rail 61, and a servomotor (not shown) that drives the slider 62. The advancing and retracting mechanism 6 holds the cutting mechanism 4 and the buff mechanism 5 at the opposite ends of the slider 62. Accordingly, when the advancing and retracting mechanism 6 causes the slider 62 to move in one direction, the cutting tool 41 of the cutting mechanism 4 protrudes from the turn table 24 or the buff 51 of the buff mechanism 5 protrudes from the turn table 24, thereby switching the cutting mechanism 4 and the buff mechanism 5. Further, the advancing and retracting mechanism 6 adjusts the amount of displacement of the slider 62 in the R direction, thereby enabling to adjust a protruding amount of the cutting tool 41 and the buff 51 from the turn table 24. The servomotor of the advancing and retracting mechanism 6 is connected to the controller in the monitoring center and drive-controlled. For example, the advancing and retracting mechanism 6 has a stroke of 85 [mm], and can be displaced forward and backward in a speed range of 0 [mm/s] to 15 [mm/s].

The laser sensor 81 measures an inner peripheral shape of the nozzle 120 (see FIG. 1 and FIGS. 3 to 5). The laser sensor 81 is installed near the edge of the turn table 24, with an irradiation direction of the laser being directed radially outward of the turn table 24. Accordingly, when the turn table 24 rotates, the position of the laser sensor 81 is moved about the axis of rotation of the turn table 24. With this configuration, the laser sensor 81 can measure the inner peripheral shape of the nozzle 120 over the entire perimeter. The laser sensor 81 is data-communicably connected to the controller in the monitoring center, and transmits an output signal to the controller.

For example, the image sensor 82 is a CCD (Charge Coupled Device) camera (see FIG. 1 and FIGS. 3 to 5). For example, the image sensor 82 is installed on a camera stand (not shown) on the turn table 24. The image sensor 82 can move an imaging direction thereof in a circumferential direction of the turn table 24. Accordingly, the image sensor 82 can capture images of a cutting position of the cutting mechanism 4, a buffing position of the buff mechanism 5, a state inside the nozzle 120 and the like from above of the table surface. The image sensor 82 is connected to a monitor in the monitoring center.

A balancing mechanism 91 is arranged on the turn table 24 (see FIGS. 3 and 4). When the cutting mechanism 4 and the buff mechanism 5 are displaced by driving the advancing and retracting mechanism 6, the balancing mechanism 91 suppresses deflection or backlash of the advancing and retracting mechanism 6 due to an external force to maintain accuracy in a cutting depth at the time of cutting. For example, the balancing mechanism 91 includes an oil hydraulic cylinder, and an oil-circulation flow channel that connects front and rear chambers of the oil hydraulic cylinder via an orifice.

A distribution box 92 and an air nozzle 93 are also arranged on the turn table 24 (see FIGS. 3 to 5). The distribution box 92 accommodates a distribution system for the cutting mechanism 4, the buff mechanism 5, the advancing and retracting mechanism 6, and the balancing mechanism 91. The air nozzle 93 injects air and has a function of blowing off cut chips generated in a cutting process, for example. The air nozzle 93 is installed respectively on a side of the cutting mechanism 4 and on a side of the buff mechanism 5. Cut chips generated at the time of a repairing operation are sucked by a vacuum pipe (not shown) and then recovered at outside of the nozzle 120.

Furthermore, the rotating shaft 23 has a hollow structure, and a slip ring 27 is arranged therein (see FIG. 2). The slip ring 27 accommodates wiring (such as electric wiring and signal wiring) to the cutting mechanism 4, the buff mechanism 5, and the advancing and retracting mechanism 6. The cutting mechanism 4, the buff mechanism 5, and the advancing and retracting mechanism 6 are connected to the controller in the monitoring center via such wiring and then drive-controlled.

Further, the rotating shaft 23 includes a plurality of swivel joints 28 at an end opposite to the flange 222 (an end positioned on a side of the containment main body 110 in a state where the repair device 1 is installed) (see FIG. 2). These swivel joints 28 become a channel for supplying working fluid for the cutting mechanism 4, the buff mechanism 5, the advancing and retracting mechanism 6, the balancing mechanism 91, and the air nozzle 93.

[Cutting Performed by Repair Device]

Figure 7:
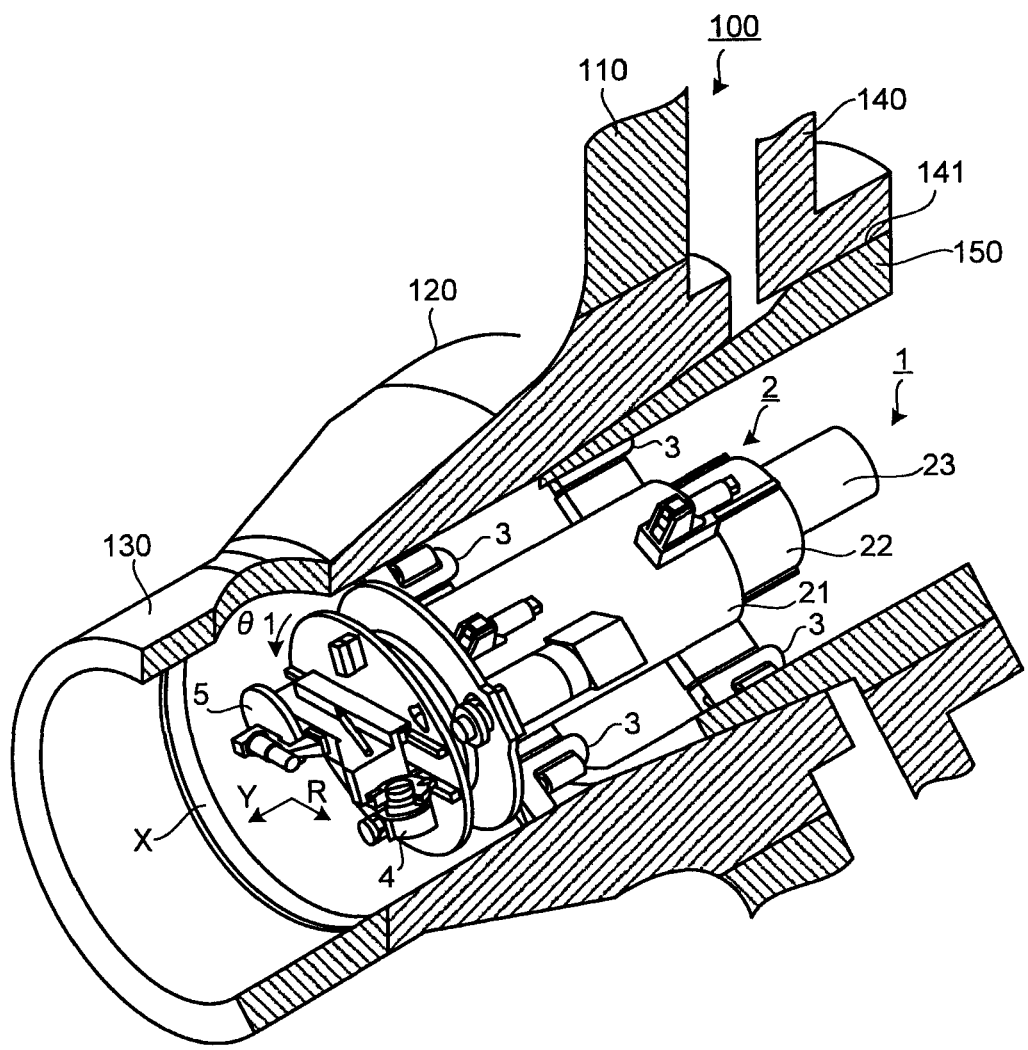
FIG. 7 is an explanatory diagram of the entire-perimeter cutting process performed by the repair device shown in FIG. 1.
Figure 8:
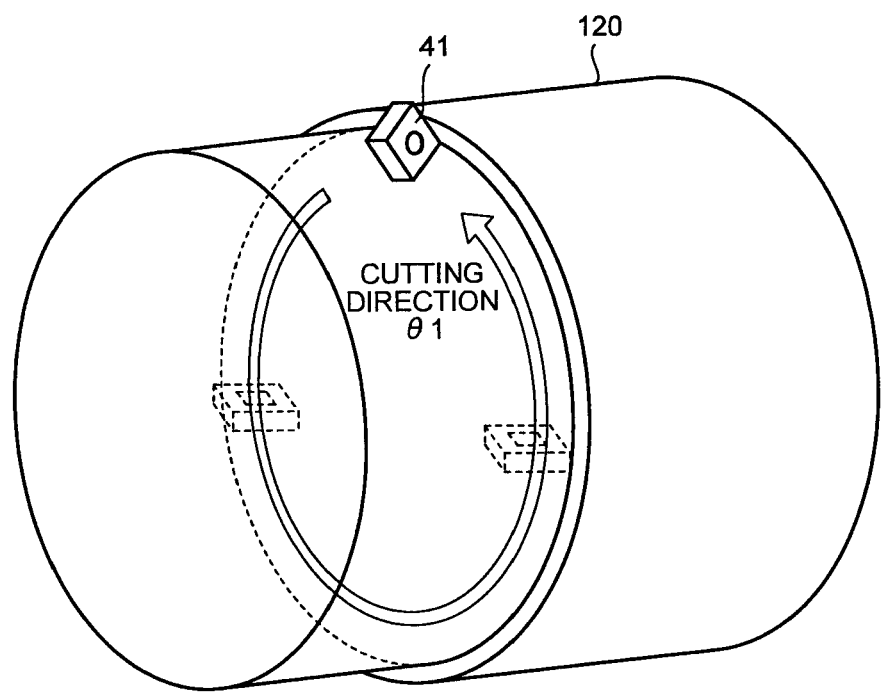
FIG. 8 is an explanatory diagram of the entire-perimeter cutting process performed by the repair device shown in FIG. 1.
Figure 9:
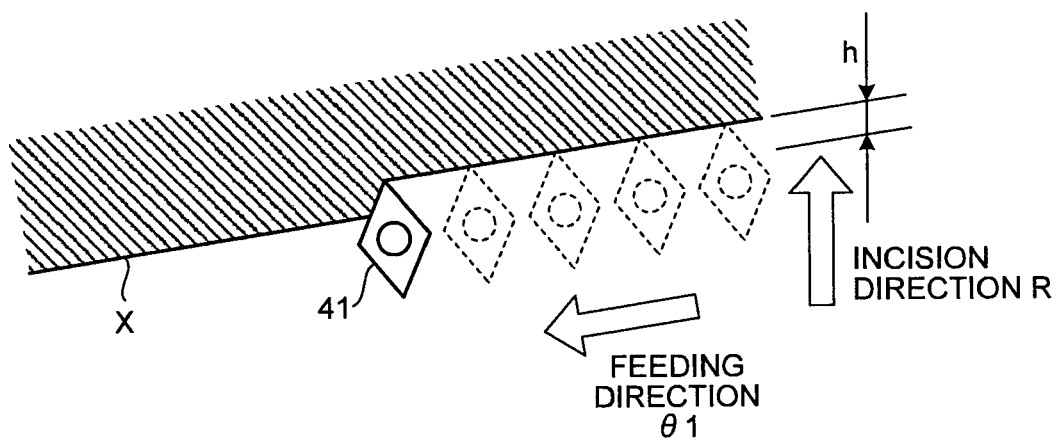
FIG. 9 is an explanatory diagram of the entire-perimeter cutting process performed by the repair device shown in FIG. 1.

FIGS. 6 to 9 are respectively a flowchart (FIG. 6) of an entire-perimeter cutting process performed by the repair device shown in FIG. 1 and explanatory diagrams thereof (FIGS. 7 to 9). Among these drawings, FIG. 7 depicts a state where the repair device 1 is installed in the nozzle 120, and FIGS. 8 and 9 depict a state of cutting the welded part X.

As mentioned above, the repair device 1 includes both functions of the cutting mechanism and the buff mechanism 5, and can respectively perform the entire perimeter cutting (Step ST5), the finish cutting (Step ST7), and the buffing (Step ST8). As an example, a case where the repair device 1 is used as the cutting device to perform the entire perimeter cutting (Step ST5) is explained (see FIG. 6).

At the entire perimeter cutting (Step ST5), the repair device 1 is transported in (Step ST51) (see FIG. 7). Specifically, the repair device 1 is inserted from the opening 141 of the work table 140 into the nozzle 120 and installed near the welded part X.

At this time, the clamp mechanism 3 clamps the inner periphery of the nozzle 120 to fix the repair device 1 (see FIG. 7). Therefore, the repair device 1 is installed in the nozzle 120 in a self-standing manner without any assistance from a side of the work table 140. Accordingly, a plurality of repair devices 1 can be arranged, respectively, in a plurality of nozzles 120 and operated independently from each other, thereby enabling to streamline a repairing operation. Because conventional repair devices cannot be installed in the nozzle in a self-standing manner, assistance such as supporting a rear part of the repair device from the side of the work table is required. Therefore, the work table is occupied for assisting one repair device, and thus there is a problem that repairing operations for a plurality of nozzles cannot be performed simultaneously.

Next, centering of the repair device 1 is performed (centering step ST52). At Step ST52, it is set such that the eight clamp mechanisms 3 reciprocally adjust the clamp height of the clamps 33 so that the shaft of the casing 21 and the shaft of the nozzle 120 substantially coincide with each other. Specifically, it is set so that the shaft of the slide shaft 22 (a Y direction) and the shaft of the nozzle 120 coincide with each other. The respective clamp mechanisms 3 fix the clamps 33, and the repair device 1 is fixedly installed in a state where centering of the repair device 1 is performed with respect to the nozzle 120.

Next, positioning of the cutting mechanism 4 is performed (positioning step ST53). At Step ST53, a positional relation between the cutting mechanism 4 and the welded part X in the axial direction of the nozzle 120 is set based on the inspection data acquired at Step ST3 (and punching). Specifically, the slide shaft 22 slides in the axial direction (the Y direction) and the turn table 24 moves in the axial direction of the nozzle 120. With this configuration, it is set so that the position of the cutting mechanism 4 on the turn table 24 and the position of the welded part X achieve a predetermined positional relation in the axial direction of the nozzle 120. At this time, image data from the image sensor 82 is transmitted to the controller, and the positional relation between the cutting mechanism 4 and the welded part X is adjusted, while confirming the image data by a monitor of the controller.

Next, the inner peripheral shape of the nozzle 120 is measured (inner-peripheral shape measuring step ST54). At Step ST54, the turn table 24 goes around in the $\theta 1$ direction, and the laser sensor 81 measures the inner peripheral shape of the nozzle 120. In this measurement, measurement data of at least the opposite ends of an area to be cut (an area subjected to cutting) is respectively acquired. Specifically, the slide shaft 22 is displaced in the Y direction to move a measurement position of the laser sensor 81, thereby acquiring the measurement data at the opposite ends of the area to be cut. The inner peripheral shape of the nozzle 120 in the entire area to be cut is estimated based on the measurement data. The area to be cut is a certain area including the welded part X, and a range in the Y direction is set based on the inspection data acquired at Step ST3.

Next, the repair device performs the entire perimeter cutting with respect to the area to be cut (entire-perimeter cutting step ST55). At Step ST55, the turn table 24 is rotated at a predetermined speed. At this time, the rotational speed of the turn table 24 is controlled so that an end of the cutting tool 41 turns at a set speed. The advancing and retracting mechanism 6 then moves the cutting mechanism 4 in the radial direction (the R direction) of the turn table 24, and brings the cutting tool 41 of the cutting mechanism 4 into contact with the inner wall surface of the nozzle 120. The cutting tool 41 then turns in the $\theta 1$ direction due to the rotations of the turn table 24, to cut the inner periphery of the nozzle 120 (see FIG. 8). Furthermore, the slide shaft 22 is gradually slid and displaced at a certain speed in the axial direction (the Y direction), so that the cutting tool 41 helically turns with a narrow pitch, thereby cutting the inner wall surface of the nozzle 120 in a cylindrical shape (entire perimeter cutting). At this time, the advancing and retracting mechanism 6 is driven and displaced forward and backward in a direction of the inner wall surface of the nozzle 120 (in the R direction). Accordingly, the turning radius of the cutting tool 41 is enlarged or contracted to adjust a cutting depth h (see FIG. 9). The cutting tool 41 can turn in a speed range of 0 [m/min] to 30 [m/min] to perform cutting by rotationally displacing the rotating shaft 23 in the rotational speed range of 0 [rpm] to 14 [rpm].

The inner peripheral shape of the nozzle 120 is not necessarily a true circle and, for example, the inner peripheral shape can be elliptical, or can include irregularities, or a bend on the inner wall surface at a weld line. Furthermore, a shaft of the repair device and the shaft of the nozzle 120 may be out of alignment. Therefore, at Step ST55, a turning trajectory of the cutting tool 41 is calculated and controlled so that the inner periphery of the nozzle 120 is cut to a certain cutting depth h. Specifically, the turning trajectory of the cutting tool 41 in the area to be cut is calculated based on a relation between the measurement data (Step ST54) of the inner peripheral shape of the nozzle 120 in the area to be cut and the predetermined cutting depth h. Further, a relation among the rotational speed of the turn table 24 in the $\theta 1$ direction, the sliding speed of the slide shaft 22 in the Y direction, and forward and backward displacement of the advancing and retracting mechanism 6 in the R direction is calculated based on the calculation result. The slide shaft 22 and the advancing and retracting mechanism 6 are driven based on the calculation result, to perform the entire perimeter cutting (profile copy cutting). Accordingly, the area to be cut is uniformly cut to the predetermined cutting depth h over the entire perimeter of the inner periphery of the nozzle 120.

Next, the cutting mechanism 4 and the slide shaft 22 are returned to initial positions, and thereafter the repair device 1 is transported out of the nozzle 120 and then recovered (Step ST56). With this process, the entire perimeter cutting step ST5 is complete.

While the entire perimeter cutting (Step ST5) has been explained as an example, the finish cutting (Step ST7) is performed in a similar manner (not shown). That is, the relation among the rotational speed of the turn table 24 in the θ1 direction, the sliding speed of the slide shaft 22 in the Y direction, and the forward and backward displacement of the advancing and retracting mechanism 6 in the R direction is calculated based on the relation between the measurement data of the inner peripheral shape of the nozzle 120 in the area to be cut (Step ST54) and the predetermined cutting depth h. The turn table 24, the slide shaft 22, and the advancing and retracting mechanism 6 are driven based on the calculation result, thereby controlling the turning trajectory of the cutting tool 41 in the area to be cut. Accordingly, the area to be cut is uniformly cut to the predetermined cutting depth h, and the finish cutting is appropriately performed.

Furthermore, the buffing (Step ST8) is also performed in a similar manner (not shown). That is, the relation among the rotational speed of the turn table 24 in the θ1 direction, the sliding speed of the slide shaft 22 in the Y direction, and the forward and backward displacement of the advancing and retracting mechanism 6 in the R direction is calculated based on the relation between the measurement data (Step ST54) of the inner peripheral shape of the nozzle 120 in an area to be buffed (same as the area to be cut) and a pressing force of the buff 51 against the inner wall surface of the nozzle 120. The buff 51 helically revolves, while rotating at a predetermined rotational speed, to perform appropriate buffing. At this time, the buff 51 buffs the area to be buffed at an appropriate moving speed by controlling the rotational speed of the turn table 24 and the sliding speed of the slide shaft 22. Further, the buff 51 buffs the area to be buffed with an appropriate pressing force, by controlling the forward and backward displacement of the advancing and retracting mechanism 6. Accordingly, the area to be buffed is appropriately buffed.

[Cutting-Tool Switching Unit of Cutting Mechanism]

Figure 10:
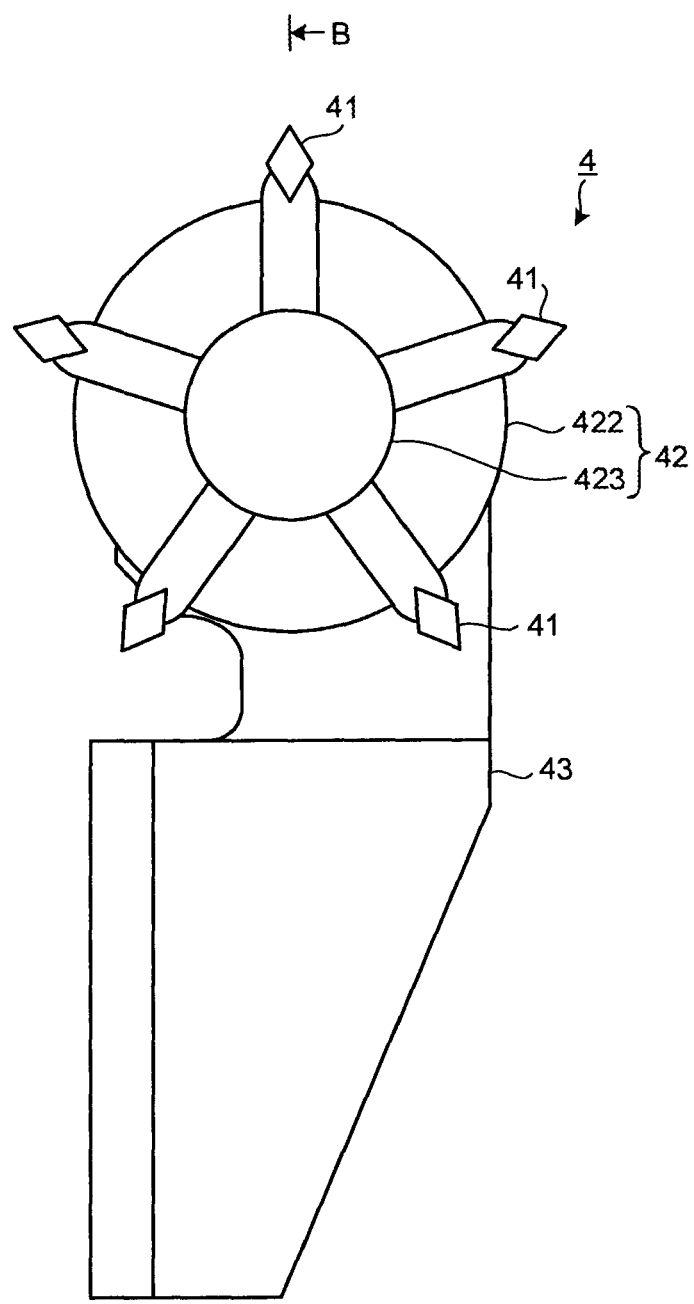
FIG. 10 is a plan view of a cutting mechanism of the repair device shown in FIG. 1.
Figure 11:
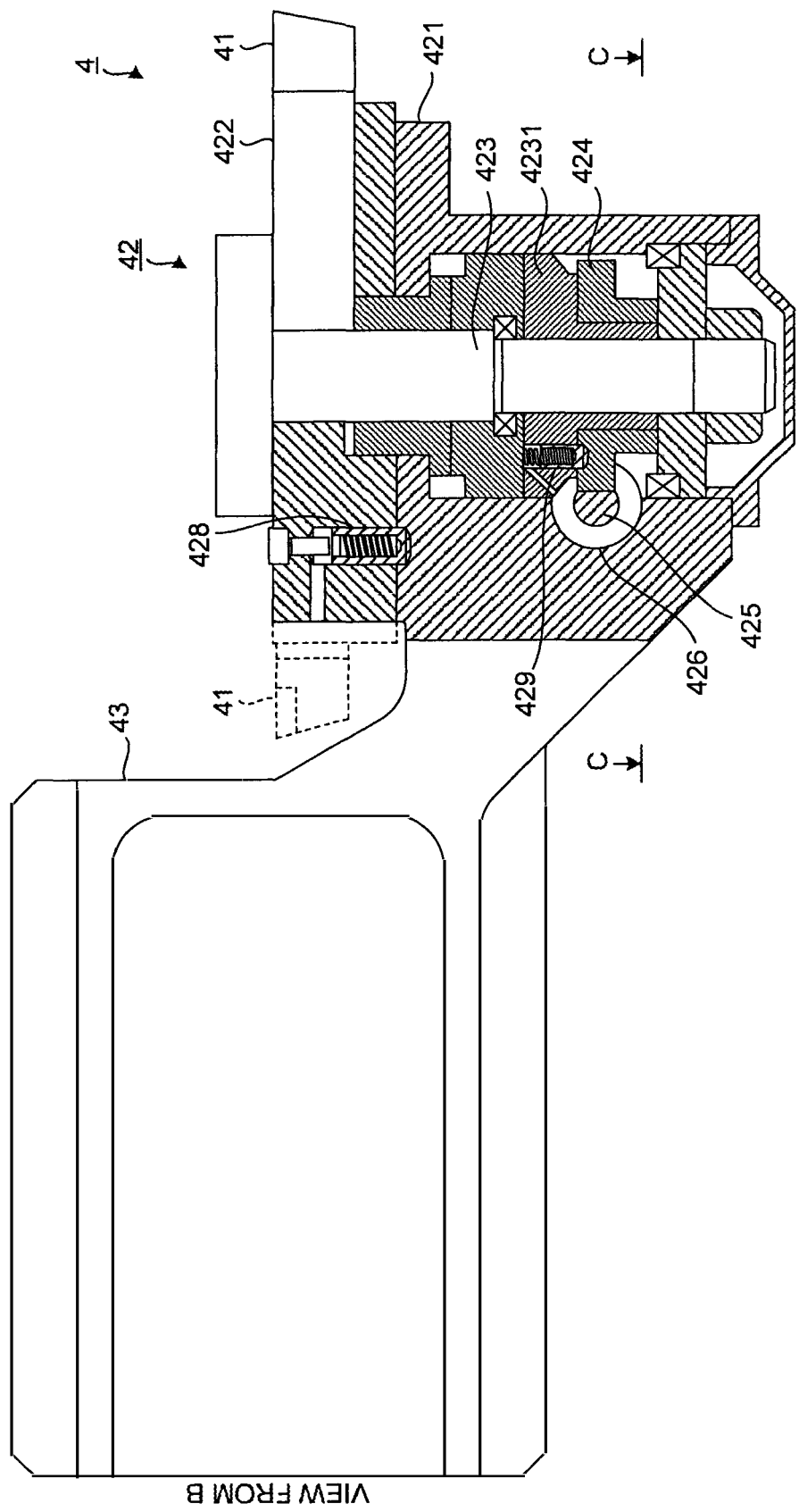
FIG. 11 is a sectional view of the cutting mechanism shown in FIG. 10 as viewed from an arrow B.
Figure 12:
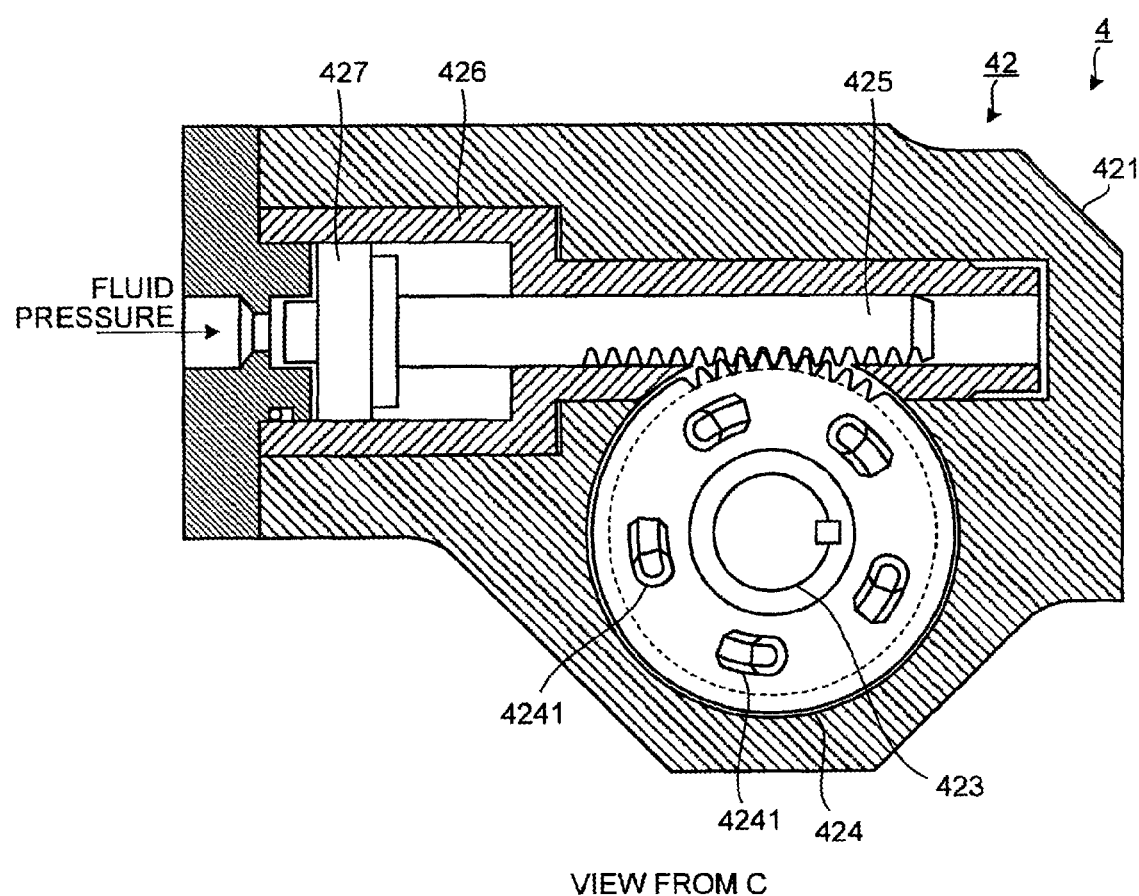
FIG. 12 is a sectional view of the cutting mechanism shown in FIG. 11 as viewed from an arrow C.

FIG. 10 is a plan view of a cutting mechanism of the repair device shown in FIG. 1. FIG. 11 and FIG. 12 are respectively a sectional view as viewed from an arrow B (FIG. 11), and a sectional view as viewed from an arrow C (FIG. 12), of the cutting mechanism shown in FIG. 10. FIGS. 13 to 16 are explanatory diagrams of a function of the cutting mechanism shown in FIG. 10.

In the repair device 1, the cutting mechanism 4 includes a structure capable of switching the cutting tools 41. A configuration of the cutting mechanism 4 is explained below.

The cutting mechanism 4 includes a plurality of cutting tools 41, a cutting-tool switching unit 42, and a cutting tool table 43 (see FIG. 10). The cutting tools 41 are tool bits for cutting, and can be constituted by the same type or different types. For example, in the present embodiment, at the entire-perimeter cutting step ST5, because the cutting tools 41 are sequentially changed and used, five cutting tools 41 of the same type are used. The cutting-tool switching unit 42 is a drive mechanism that holds the cutting tools 41 and moves and switches these cutting tools 41. The cutting-tool switching unit 42 is explained later in detail. The cutting tool table 43 is a member that fixes the cutting mechanism 4 to the slider 62 of the advancing and retracting mechanism 6. For example, in the present embodiment, the cutting tool table 43 supports the cutting-tool switching unit 42, and is fixed to the slider 62 of the advancing and retracting mechanism 6. With this configuration, the cutting mechanism 4 and the slider 62 of the advancing and retracting mechanism 6 are integrated.

The cutting-tool switching unit 42 includes a switching-unit main body 421, a cutting-tool support body 422, a fitted rotating shaft 423, a pinion 424, a rack 425, a cylinder 426, a piston 427, a first positioning pin 428, and a second positioning pin 429 (see FIG. 11).

The switching-unit main body 421 is a casing having a substantially cylindrical container shape. The cutting-tool support body 422 holds the cutting tools 41. The cutting-tool support body 422 has a substantially disk-like shape, and holds the five cutting tools 41 with an equal gap on an outer peripheral edge on the upper surface side thereof. The fitted rotating shaft 423 is a rotating shaft of the cutting-tool support body 422. The cutting-tool support body 422 and an internal mechanism of the switching-unit main body 421 are connected to each other via the fitted rotating shaft 423. An upper surface of the switching-unit main body 421 and a lower surface of the cutting-tool support body 422 are made to abut on each other, and the fitted rotating shaft 423 is inserted into the cutting-tool support body 422 from the upper surface of the cutting-tool support body 422. The fitted rotating shaft 423 and the cutting-tool support body 422 are coupled by a bolt and integrated on the upper surface of the cutting-tool support body 422. A flange 4231 is formed on the fitted rotating shaft 423.

The pinion 424 is rotatably fitted to and installed on the fitted rotating shaft 423, with one surface of the pinion 424 abutting on the flange 4231 of the fitted rotating shaft 423. The rack 425 is inserted into and slidably arranged in the cylinder 426 in the switching-unit main body 421. The pinion 424 and the rack 425 constitute a rack/pinion mechanism 424, 245. The cylinder 426 is buried in the switching-unit main body 421. The piston 427 is a member that presses the rack 425 in an axial direction. The piston 427 is connected to an end of the rack 425, and is inserted into and arranged in the cylinder 426 together with the rack 425. When a fluid pressure such as an air pressure is applied from behind, the piston 427 presses the rack 425 in an axial direction at the front by the fluid pressure. The fluid pressure to be applied to the piston 427 is supplied from outside of the repair device 1 to the cutting mechanism 4 via the swivel joints 28 and the rotating shaft 23 (see FIG. 2).

Figure 13:
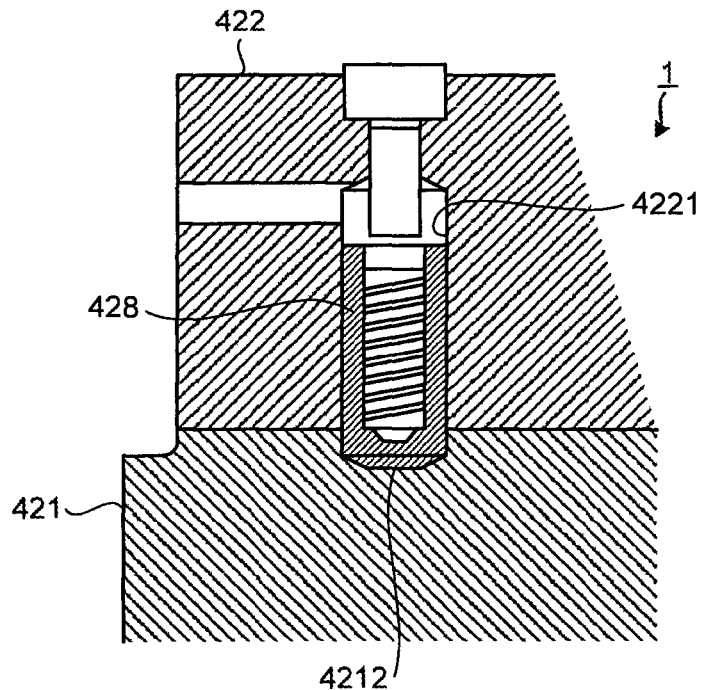
FIG. 13 is an explanatory diagram of a function of the cutting mechanism shown in FIG. 10.

The first positioning pin 428 controls a positional relation between the switching-unit main body 421 and the cutting-tool support body 422 (see FIGS. 11 and 13). A ratchet groove 4212 is formed on the upper surface of the switching-unit main body 421, and a pin hole 4221 is formed on the lower surface of the cutting-tool support body 422. The first positioning pin 428 is inserted into the pin hole 4221 in the cutting-tool support body 422, and an apex thereof is arranged, engaged with the ratchet groove 4212 on the switching-unit main body 421. The first positioning pin 428 biases the apex thereof into engagement with the ratchet groove 4212 by a spring force. Accordingly, the first positioning pin 428 and the ratchet groove 4212 engages with each other to constitute a first ratchet mechanism 428, 4212.

Figure 14:
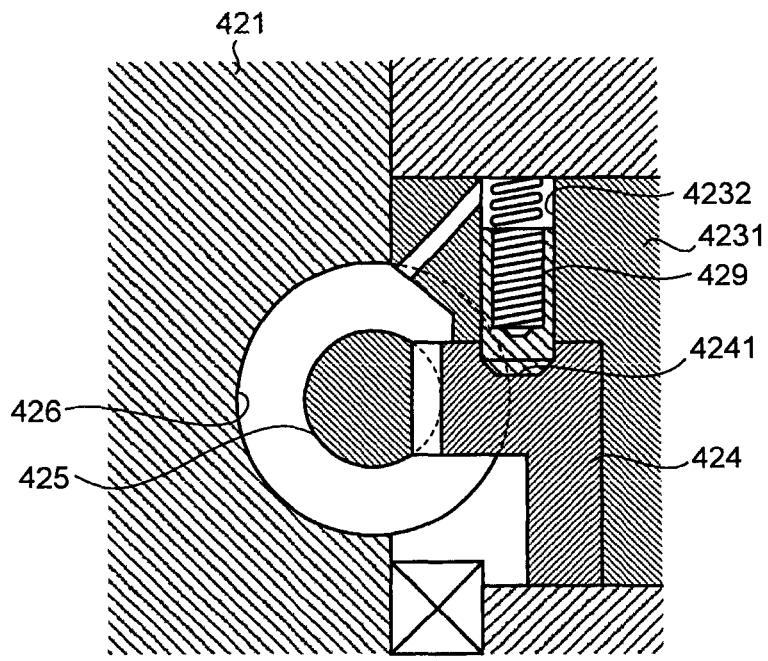
FIG. 14 is an explanatory diagram of a function of the cutting mechanism shown in FIG. 10.

The second positioning pin 429 controls a positional relation between the flange 4231 of the fitted rotating shaft 423 and the pinion 424 of the rack/pinion mechanism 424, 245 (see FIGS. 11 and 14). A ratchet groove 4241 is formed on an upper surface of the pinion 424, and a pin hole 4232 is formed on a lower surface of the flange 4231. The second positioning pin 429 is inserted into the pin hole 4232 in the flange 4231, and an apex thereof is arranged, engaged with the ratchet groove 4241 on the pinion 424. The second positioning pin 429 biases the apex thereof into engagement with the ratchet groove 4241 by a spring force. Accordingly, the second positioning pin 429 and the ratchet groove 4241 engages with each other to constitute a second ratchet mechanism 429, 4241.

When the pinion 424 rotates in a forward direction, the second ratchet mechanism 429, 4241 is separated to rotate only the pinion 424. When the pinion 424 rotates in an opposite direction, the second ratchet mechanism 429, 4241 engages to connect the pinion 424 to the flange 4231. In this example, when the piston 427 is driven in the forward direction to rotate the pinion 424, the pinion 424 rotates in the opposite direction. Accordingly, the second ratchet mechanism 429, 4241 engages, and the pinion 424 and the flange 4231 rotate together. On the other hand, when the piston 427 is driven in the opposite direction to rotate the pinion 424, the pinion 424 rotates in the forward direction. Accordingly, the second ratchet mechanism 429, 4241 is separated and only the pinion 424 rotates.

Figure 15:
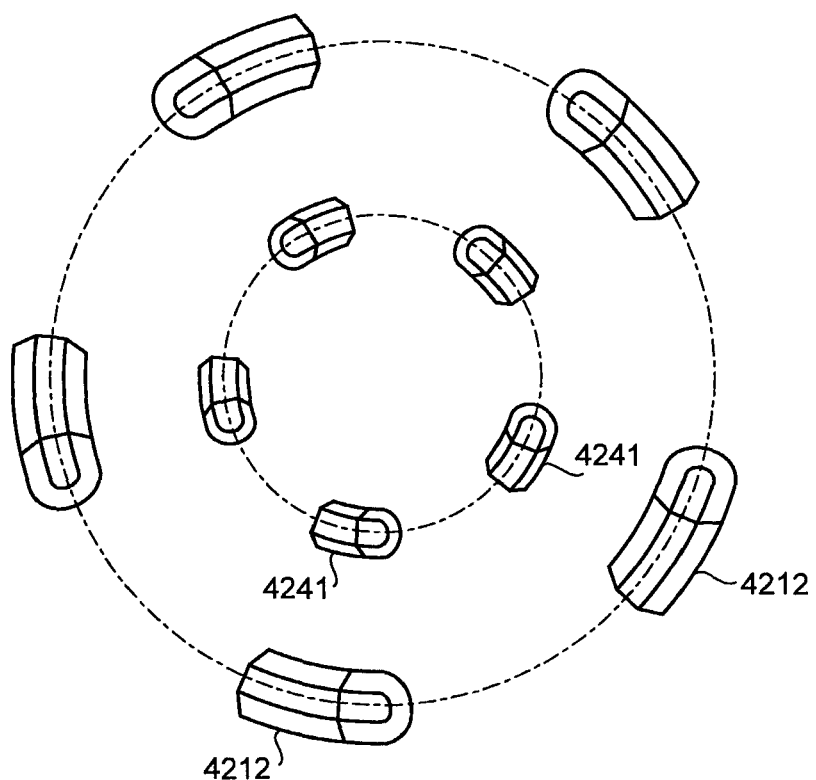
FIG. 15 is an explanatory diagram of a function of the cutting mechanism shown in FIG. 10.
Figure 16:
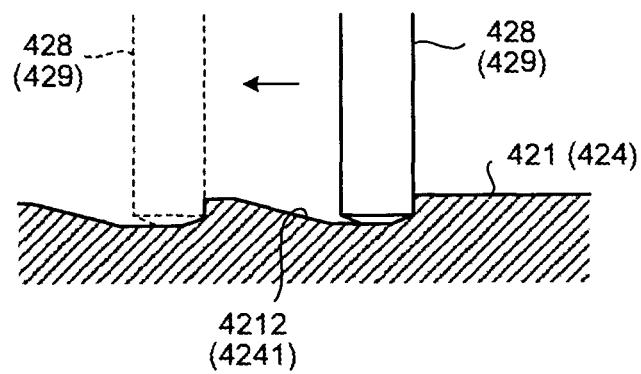
FIG. 16 is an explanatory diagram of a function of the cutting mechanism shown in FIG. 10.

Furthermore, the first ratchet mechanism 428, 4212, and the second ratchet mechanism 429, 4241 are respectively formed, corresponding to the arrangement of the five cutting tools 41 held by the cutting-tool support body 422 (see FIG. 15).

In the cutting mechanism 4, switching of the cutting tools 41 is performed as described below.

In a fixed state of the cutting tools 41, a fluid pressure (for example, a hydraulic pressure) is applied to a predetermined position in the switching-unit main body 421. For example, in the present embodiment, the fluid pressure is applied to a narrow gap (not shown) between the flange fixed to the fitted rotating shaft 423 and an inner wall surface of the switching-unit main body 421. Alternatively, the fluid pressure can be applied to a narrow gap (not shown) on a bonded surface between the flange fixed to the fitted rotating shaft 423 and the flange fixed in the switching-unit main body 421. The fitted rotating shaft 423 is then pressed against the switching-unit main body 421 due to the fluid pressure and fixed. Because the cutting-tool support body 422 is fixed on the fitted rotating shaft 423, the cutting-tool support body 422 is fixed with respect to the switching-unit main body 421. With this configuration, the cutting-tool switching unit 42 is fixed with respect to an external force and an internal rotation force, and the cutting tools 41 become fixed. In this state, the fluid pressure is not applied to the piston 427.

At the time of switching the cutting tools 41, the hydraulic pressure (a hydraulic pressure applied to a predetermined position in the switching-unit main body 421) for fixing the cutting tools 41 (the cutting-tool switching unit 42) is released. Accordingly, the cutting-tool switching unit 42 can rotate freely, thereby enabling to switch the cutting tools 41. Subsequently, the fluid pressure is applied to the piston 427 (see FIG. 12). Supply of the air pressure to the first positioning pin 428 and the second positioning pin 429 is stopped, and a locked state of the first ratchet mechanism 428, 4212 and the second ratchet mechanism 429, 4241 is released. When the piston 427 is driven in the forward direction due to the fluid pressure, the rack 425 is pressed and moved deep into the cylinder 426 (by a shift amount when one cutting tool 41 is shifted). The pinion 424 rotates due to an engagement with the rack 425. In this state, the pinion 424 rotates in the opposite direction. Accordingly, the second ratchet mechanism 429, 4241 engages, and the pinion 424 and the flange 4231 rotate together. The fitted rotating shaft 423 then rotates together with the flange 4231, and the cutting-tool support body 422 rotates together with the fitted rotating shaft 423 (see FIG. 11). The rotation direction thereof becomes the forward direction with respect to the first ratchet mechanism 428, 4212. Therefore, the cutting-tool support body 422 rotates with respect to the switching-unit main body 421, and the cutting tools 41 are rotated by one cutting tool. With this process, switching of the cutting tools 41 is performed.

The piston 427 returns to the original position due to releasing of a fluid pressure. The piston 427 is then driven in the opposite direction, and the rack 425 is returned. The pinion 424 is then rotated due to the engagement with the rack 425. In this state, the pinion 424 is rotated in the opposite direction. Accordingly, the second ratchet mechanism 429, 4241 is separated, and only the pinion 424 rotates. Therefore, the cutting tool 41 remains in a fixed state because the flange 4231 (the fitted rotating shaft 423) does not rotate.

Furthermore, switching of the cutting tools 41 is performed at the time of a cutting operation (Steps ST5 and ST7). For example, in the repair of the nozzle 120, because the area to be cut may be wide, all areas to be cut may not be cut only by a single cutting tool 41.

Therefore, the cutting mechanism 4 includes the cutting-tool switching unit 42 and performs cutting while replacing the cutting tools 41 by the cutting-tool switching unit 42, thereby enabling to continue the cutting operation, with the repair device 1 being installed in the nozzle 120. Accordingly, a repairing operation is streamlined.

[Effect 1]

As explained above, the repair device 1 includes the casing 21, the slide shaft 22 slidably arranged with respect to the casing 21, the turn table 24 rotatably arranged with respect to the slide shaft 22, the cutting mechanism 4 installed on the turn table 24 and including the cutting tools 41, and the advancing and retracting mechanism 6 that displaces a radius of rotation of the cutting mechanism 4 with respect to the rotations of the turn table 24 forward and backward (see FIGS. 1 to 5). Furthermore, in a state where the casing 21 is centered and positioned with respect to the pipe (the nozzle 120), the turn table 24 is rotationally displaced while the slide shaft 22 slides in an axial direction, and the advancing and retracting mechanism 6 displaces the cutting mechanism 4 forward and backward. Accordingly, the cutting tools 41 helically turn along the inner peripheral shape of the pipe to cut the inner periphery of the pipe (see FIGS. 6 to 9). In such a configuration, rotational cutting by the cutting tools 41 is realized by an interaction among sliding displacement of the slide shaft 22, rotational displacement of the turn table 24, and forward and backward displacement of the buff mechanism 5. Thereby, the area to be cut having a substantially cylindrical shape can be cut smoothly, thereby improving cutting accuracy. Accordingly, any aftertreatment is not required, and a repairing operation can be streamlined. For example, in a configuration in which a cutting mechanism helically revolves to perform cutting, while rotating a cutting tool (see Patent Literature 1), aftertreatment becomes necessary due to a step generated in a cutting trace.

Furthermore, the repair device 1 includes a measuring unit (the laser sensor 81) that acquires measurement data of the inner peripheral shape of the pipe (see FIG. 1 and FIGS. 3 to 5). The relation among the sliding speed of the slide shaft 22, the rotational speed of the turn table 24, and forward and backward displacement of the cutting mechanism 4 is calculated based on the relation between the acquired measurement data and the predetermined cutting depth h, to control the turning trajectory of the cutting tool 41 (see Steps ST54 and ST55 in FIG. 6). In such a configuration, the area to be cut can be cut along the inner peripheral shape of the pipe (profile copy rotational cutting). Accordingly, the area to be cut having a non-uniform shape can be cut accurately. In such a configuration, the turning trajectory of the cutting tool 41 can be finely adjusted, thereby enabling to simplify a centering operation of the repair device 1 with respect to the nozzle 120 (Step ST42). That is, when the repair device 1 is to be installed in the nozzle 120, centering needs only to be performed in such a degree that an axis of the slide shaft 22 (the Y direction) and an axis of the nozzle 120 substantially agree with each other, and the positional relation between an outer peripheral edge of the turn table 24 and the inner periphery of the nozzle 120 do not need to be strictly determined.

The repair device 1 includes the buff mechanism 5 having the buff 51 for buffing (see FIG. 1 and FIGS. 3 to 5). The buff mechanism 5 and the cutting mechanism 4 are installed so as to be changed by the turn table 24. In such a configuration, because the repair device 1 serves as the buff mechanism 5 and the cutting mechanism 4, there is an advantage in that operations related to transporting in/out and installation of the device can be omitted, as compared to a configuration in which the buff mechanism and the cutting mechanism are separately used.

In the repair device 1, the advancing and retracting mechanism 6 displaces the turning radius of the buff mechanism 5 with respect to the rotations of the turn table 24 forward and backward (see FIG. 1 and FIGS. 3 to 5). In such a configuration, buffing can be performed by revolving the buff 51 helically while in rotation, by an interaction among sliding displacement of the slide shaft 22, rotational displacement of the turn table 24, and forward and backward displacement of the buff mechanism 5. With this configuration, buffing can be smoothly performed with respect to the area to be buffed having a substantially cylindrical shape. Particularly, by controlling the turning trajectory of the buff 51 based on the relation between the measurement data (Step ST54) of the inner peripheral shape of the pipe in the area to be buffed and the pressing force of the buff 51 against the inner periphery of the pipe, buffing can be appropriately performed with respect to the area to be buffed with a predetermined pressing force and a predetermined moving speed.

The repair device 1 includes the clamp mechanism 3 that holds the casing 21 in a state where the casing 21 is positioned in the pipe (see FIGS. 1 and 7). In such a configuration, because the clamp mechanism 3 appropriately holds the position of the casing 21 (particularly, a relative position of the repair device in an axial direction of the pipe with respect to a target to be cut) at the time of controlling the turning trajectory of the cutting tool 41, the repair device 1 is installed in the pipe in a self-standing manner. With this configuration, because each of the repair devices 1 can be arranged in a plurality of pipes and individually operated, a repairing operation can be streamlined.

This repair method includes the inner-peripheral shape measuring step (Step ST54) of acquiring the measurement data of the inner peripheral shape of the pipe, and the cutting step (Step ST55) at which profile copy cutting is performed with respect to the inner periphery of the pipe, while the cutting tool 41 is being turned helically along the inner peripheral shape of the pipe (see FIGS. 6 to 9). In such a configuration, because cutting (profile copy rotational cutting) can be performed with respect to the area to be cut along the inner peripheral shape of the pipe, the area to be cut having a non-uniform shape can be cut accurately. Accordingly, any aftertreatment is not required, and thus a repairing operation can be streamlined.

[Effect 2]

The repair device 1 includes the casing 21, the slide shaft 22 slidably arranged with respect to the casing 21, the turn table 24 rotatably arranged with respect to the slide shaft 22, and the cutting mechanism 4 installed on the turn table 24 and including the cutting tools 41 (see FIGS. 1 to 5). Furthermore, the turn table 24 is rotationally displaced while the slide shaft 22 slides in an axial direction, so that the cutting tools 41 helically turn to cut the inner periphery of the pipe (the nozzle 120) (see FIGS. 6 to 9). Further, the cutting mechanism 4 includes the cutting-tool switching unit 42 that switches the cutting tools 41 (see FIGS. 10 to 12). In such a configuration, the cutting tools 41 helically turn to cut the inner periphery. Therefore, when the area to be cut is wide, the cutting tools 41 need to be replaced. At this time, the cutting mechanism 4 performs cutting while replacing the cutting tools 41 by the cutting-tool switching unit 42, thereby enabling to continue a cutting operation, with the repair device 1 being installed in the pipe. Accordingly, a repairing operation can be streamlined.

In the repair device 1, the cutting-tool switching unit 42 includes the switching-unit main body 421 installed on a side of the turn table 24, the cutting-tool support body 422 that supports the plurality of cutting tools 41 and switches the cutting tools 41 by rotational displacement, the fitted rotating shaft 423 connected to the cutting-tool support body 422, and the drive mechanism (the piston 427) connected to the fitted rotating shaft 423 via the ratchet mechanism (the second ratchet mechanism 429, 4241) (see FIGS. 11 and 12). In such a configuration, when the drive mechanism (the piston 427) is driven in the predetermined forward direction, the ratchet mechanism (the second ratchet mechanism 429, 4241) engages to rotate the fitted rotating shaft 423. Accordingly, the cutting-tool support body 422 rotates to switch the cutting tools 41. On the other hand, when the drive mechanism (the piston 427) is driven in the opposite direction, the ratchet mechanism (the second ratchet mechanism 429, 4241) restricts rotations of the fitted rotating shaft 423. Accordingly, the drive mechanism (the piston 427) returns to an initial position without switching the cutting tools 41.

The repair device 1 includes a fixing structure in which the cutting-tool switching unit 42 supplies fluid to between the fitted rotating shaft 423 and the switching-unit main body 421 and presses the fitted rotating shaft 423 against the switching-unit main body 421, thereby fixing the fitted rotating shaft 423 (see FIG. 11). In such a configuration, the fluid pressure is applied between the fitted rotating shaft 423 and the switching-unit main body 421, thereby fixing the cutting-tool support body 422 to the switching-unit main body 421 via the fitted rotating shaft 423. Furthermore, the cutting-tool support body 422 can be rotated by releasing the fluid pressure, thereby enabling to switch the cutting tools 41. Accordingly, fixing and releasing of the cutting-tool switching unit 41 can be performed with a simple configuration.

INDUSTRIAL APPLICABILITY

As described above, the repair device according to the present invention is advantageous in a characteristic that a repairing operation can be streamlined.

REFERENCE SIGNS LIST 1 repair device
2 drive mechanism
21 casing
22 slide shaft 221 bearing
222 flange
23 rotating shaft
231 flange
24 turn table
25 slide shaft actuator
251 guide rail
252 slider
26 rotating shaft actuator
27 slip ring
28 swivel joint
3 clamp mechanism
31 cylinder
32 linking unit
33 clamp
4 cutting mechanism
41 cutting tool
42 cutting-tool switching unit
421 switching-unit main body
4212 ratchet groove
422 cutting-tool support body
4221 pin hole
423 fitted rotating shaft
4231 flange
4232 pin hole
424 pinion
4241 ratchet groove
425 rack
426 cylinder
427 piston
428 first positioning pin
429 second positioning pin
43 cutting tool table
5 buff mechanism
52 drive part
51 buff
6 advancing and retracting mechanism
61 rail
62 slider
81 laser sensor
82 image sensor
91 balancing mechanism
92 distribution box
93 air nozzle
10 cutter
100 reactor containment
110 containment main body
120 nozzle
130 pipe
140 work table
141 opening
150 shield

The invention claimed is:

1. A repair device that repairs a welded part on an inner peripheral side of a pipe, comprising:
a casing;
a slide shaft slidably arranged with respect to the casing;
a turn table rotatably arranged with respect to the slide shaft; and
a cutting mechanism installed on the turn table and including a plurality of cutting tools for cutting the welded part, wherein
the turn table is rotationally displaced while the slide shaft slides in an axial direction, so that the cutting tools helically turn to cut an inner periphery of the pipe, and
the cutting mechanism includes a cutting-tool switching unit that switches the cutting tools,
the cutting-tool switching unit includes a switching-unit main body installed on a side of the turn table, a cutting-tool support body that supports the cutting tools and switches the cutting tools by a rotational displacement, a fitted rotating shaft that is connected to the cutting-tool support body, and a drive mechanism that is connected to the fitted rotating shaft via a ratchet mechanism, and
the ratchet mechanism engages to rotate the fitted rotating shaft when the drive mechanism is driven in a predetermined forward direction, and the ratchet mechanism restricts rotations of the fitted rotating shaft when the drive mechanism is driven in an opposite direction.

2. The repair device according to claim 1, wherein the cutting-tool switching unit includes a fixing structure that supplies fluid to between the fitted rotating shaft and the switching-unit main body and presses the fitted rotating shaft to the switching-unit main body, thereby fixing the fitted rotating shaft.

* * * * *